(12) United States Patent
Smith

(10) Patent No.: US 6,208,265 B1
(45) Date of Patent: Mar. 27, 2001

(54) ELECTROMAGNETIC SIGNAL PICKUP APPARATUS AND METHOD FOR USE OF SAME

(75) Inventor: Harrison C. Smith, Anna, TX (US)

(73) Assignee: Halliburton Energy Services, Inc., Dallas, TX (US)

(*) Notice: Subject to any disclaimer, the term of this patent is extended or adjusted under 35 U.S.C. 154(b) by 0 days.

(21) Appl. No.: 08/958,750

(22) Filed: Oct. 31, 1997

(51) Int. Cl.⁷ .................................................. G01V 3/00
(52) U.S. Cl. .................. 340/854.6; 340/853.1; 340/854.3; 367/81; 73/152.45
(58) Field of Search ................. 340/853.1, 853.5, 340/854.6, 855.6, 854.3; 367/81; 73/152.45; 166/66, 66.5, 250.1, 248

(56) References Cited

U.S. PATENT DOCUMENTS

| | | | |
|---|---|---|---|
| 2,354,887 | 8/1944 | Silverman et al. | 177/352 |
| 2,364,957 | 12/1944 | Douglas | 175/182 |
| 2,425,868 * | 8/1947 | Dillon | 367/81 |
| 3,831,138 | 8/1974 | Rammner | 340/18 LD |
| 4,160,970 | 7/1979 | Nicolson | 340/18 LD |
| 4,181,014 | 1/1980 | Zuvela et al. | 73/151 |
| 4,980,682 | 12/1990 | Klein et al. | 340/854 |
| 4,994,629 | 2/1991 | Tatum, Jr. et al. | 174/6 |
| 5,026,508 | 6/1991 | Tatum, Jr. et al. | 252/502 |
| 5,040,599 * | 8/1991 | Pfalser et al. | 166/248 |
| 5,080,773 | 1/1992 | Tatum, Jr. et al. | 204/196 |
| 5,130,706 | 7/1992 | Van Steenwyk | 340/854.6 |
| 5,189,415 | 2/1993 | Shimada et al. | 340/854.6 |
| 5,576,703 | 11/1996 | MacLeod et al. | 340/854.4 |

* cited by examiner

*Primary Examiner*—Michael Horabik
*Assistant Examiner*—Timothy Edwards, Jr.
(74) *Attorney, Agent, or Firm*—Paul I. Herman; Lawrence R. Youst

(57) ABSTRACT

An electromagnetic pickup apparatus (46) and method for use of the same is disclosed. The apparatus (46) comprises a probe (60) that is insertable into a bore hole (64) or a trench (70) and a conductive backfill composition (62) that substantially surrounds the probe (60) having intimate contact with the probe (60) and the earth, thereby establishing a highly electrically conductive region (66) between the probe (60) and the earth.

18 Claims, 2 Drawing Sheets

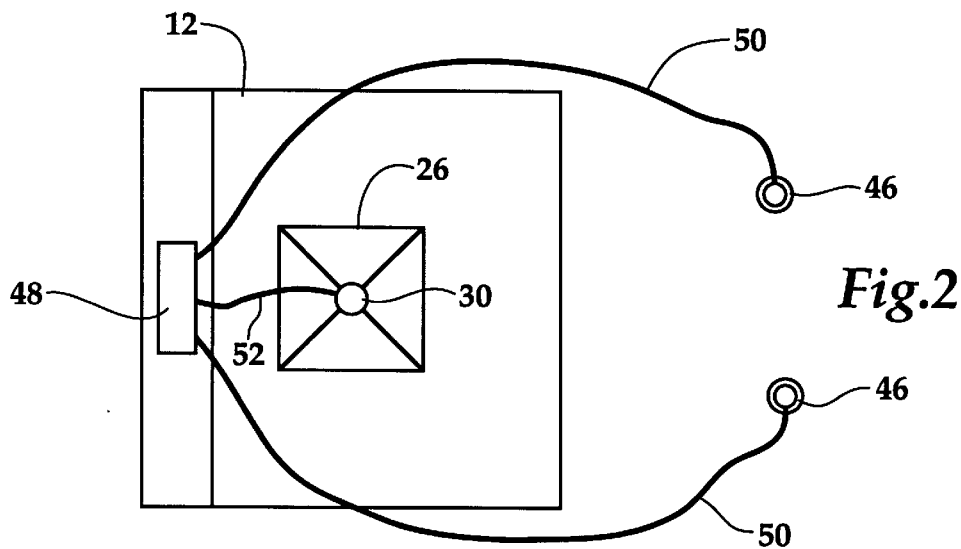
Fig.2
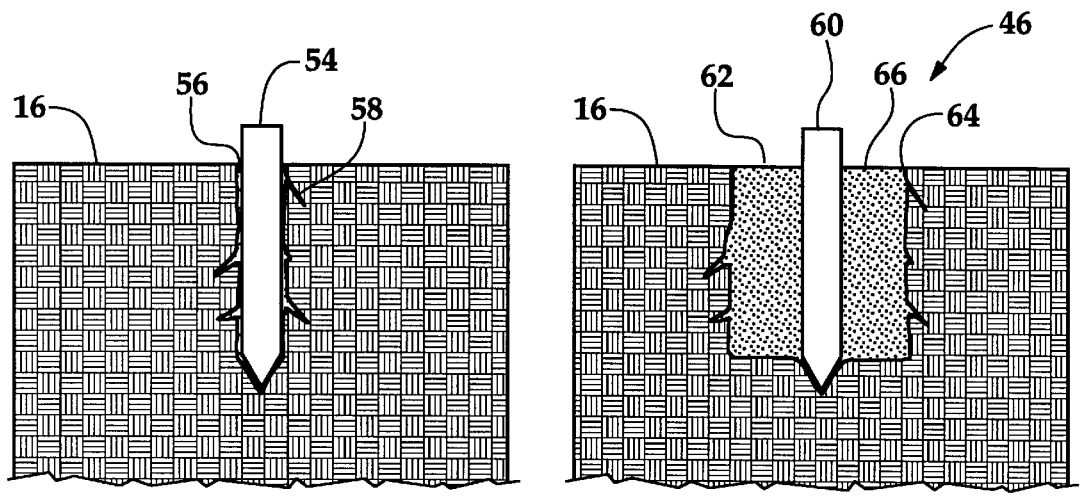
Fig.3 (PRIOR ART)
Fig.4
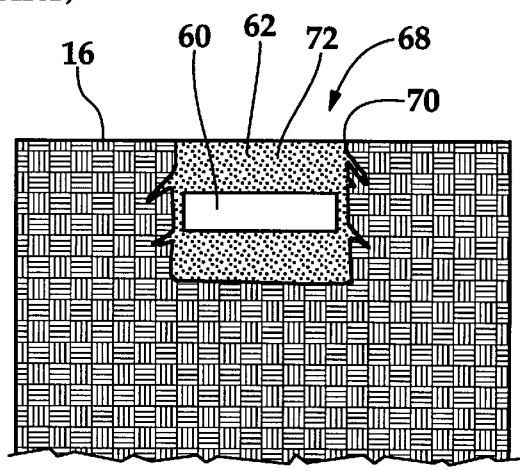
Fig.5

ELECTROMAGNETIC SIGNAL PICKUP APPARATUS AND METHOD FOR USE OF SAME

TECHNICAL FIELD OF THE INVENTION

This invention relates in general to downhole telemetry and, in particular to, an electromagnetic signal pickup apparatus that substantially reduces the attenuation of an electromagnetic signal in the region near an electromagnetic pickup probe.

BACKGROUND OF THE INVENTION

Without limiting the scope of the invention, its background is described in connection with transmitting downhole data to the surface during measurements while drilling (MWD), as an example. It should be noted that the principles of the present invention are applicable not only during drilling, but throughout the life of a wellbore including, but not limited to, during logging, testing, completing and producing the well.

Heretofore, in this field, a variety of communication and transmission techniques have been attempted to provide real time data from the vicinity of the bit to the surface during drilling. The utilization of MWD with real time data transmission provides substantial benefits during a drilling operation. For example, continuous monitoring of downhole conditions allows for an immediate response to potential well control problems and improves mud programs.

Measurement of parameters such as bit weight, torque, wear and bearing condition in real time provides for a more efficient drilling operations. In fact, faster penetration rates, better trip planning, reduced equipment failures, fewer delays for directional surveys, and the elimination of a need to interrupt drilling for abnormal pressure detection is achievable using MWD techniques.

At present, there are four major categories of telemetry systems that have been used in an attempt to provide real time data from the vicinity of the drill bit to the surface, namely mud pressure pulses, insulated conductors, acoustics and electromagnetic waves.

In a mud pressure pulse system, the resistance of mud flow through a drill string is modulated by means of a valve and control mechanism mounted in a special drill collar near the bit. This type of system typically transmits at 1 bit per second as the pressure pulse travels up the mud column at or near the velocity of sound in the mud. It has been found, however, that the rate of transmission of measurements is relatively slow due to pulse spreading, modulation rate limitations, and other disruptive limitations such as the requirement of mud flow.

Insulated conductors, or hard wire connection from the bit to the surface, is an alternative method for establishing downhole communications. This type of system is capable of a high data rate and two way communication is possible. It has been found, however, that this type of system requires a special drill pipe and special tool joint connectors which substantially increases the cost of a drilling operation. Also, these systems are prone to failure as a result of the abrasive conditions of the mud system and the wear caused by the rotation of the drill string.

Acoustic systems have provided a third alternative. Typically, an acoustic signal is generated near the bit and is transmitted through the drill pipe, mud column or the earth. It has been found, however, that the very low intensity of the signal which can be generated downhole, along with the acoustic noise generated by the drilling system, makes signal detection difficult. Reflective and refractive interference resulting from changing diameters and thread makeup at the tool joints compounds the signal attenuation problem for drill pipe transmission.

The fourth technique used to telemeter downhole data to the surface uses the transmission of electromagnetic waves through the earth. A current carrying downhole data are input to a toroid or collar positioned adjacent to the drill bit or input directly to the drill string. When a toroid is utilized, a primary winding, carrying the data for transmission, is wrapped around the toroid and a secondary is formed by the drill pipe. A receiver, typically a conductive rod or probe, is inserted into the ground at the surface where the electromagnetic signal is picked up and the data carried therein is processed. It has been found, however, that cracking in the earth around the probe and discontinuities in the contact between the probe and the earth create a high resistivity interface between the probe and the earth that significantly attenuates the strength of the electromagnetic waves which, in turn, greatly reduces the allowable distance between the transmitter and the receiver. Additionally, poor contact between the probe and the earth serves as a source of unwanted noise.

Therefore, a need has arisen for a system that is capable of telemetering real time data from the vicinity of the drill bit in a deep or noisy well using electromagnetic waves to carry the information to the surface. A need has also arisen for an electromagnetic pickup system that can receive electromagnetic wave from a transmitter at a great distance without attenuating the signal at the interface between the probe and the earth.

SUMMARY OF THE INVENTION

The present invention disclosed herein comprises a electromagnetic signal pickup apparatus that utilizes a probe for receiving electromagnetic signals carrying information and a method for use of the same. The apparatus and method of the present invention provide for real time communication between downhole equipment and the surface using electromagnetic waves to carry information. The apparatus and method of the present invention overcome the attenuation of the electromagnetic signals caused by the high resistivity interface typically associated with cracking in the earth around the probe and discontinuities in the contact between the probe and the earth, thereby greatly increasing the allowable distance between the transmitter and the electromagnetic signal pickup apparatus.

The electromagnetic pickup apparatus of the present invention comprises a probe that is positioned in a bore hole or trench in the earth. The bore hole has a length and diameter sufficient for the insertion of the probe such that the probe is in a spaced apart relationship with the sides of the bore hole creating an annulus therebetween. Alternatively, the trench has a length and depth sufficient for receiving the probe.

A conductive backfill composition is placed around the probe to substantially surround the probe and to be in intimate contact with the probe and the earth. The conductive backfill composition thereby establishes a highly electrically conductive region around the probe that fills any crack in the earth and prevents any discontinuities in the electrical contact between the probe and the earth. This highly electrically conductive region of conductive backfill composition substantially reduces the attenuation of a received electromagnetic signal.

The conductive backfill composition may comprise a carbonaceous material such as graphite or a calcine fluid petroleum coke. The conductive backfill composition may be sized to less than 16 mesh, i.e., pass through a Tyler standard number 16 sieve.

The method of the present invention reduces the attenuation of a received electromagnetic signal. The method comprises drilling a bore hole or digging a trench in the earth and inserting the probe into the bore hole or trench. The probe has a spaced apart relationship with the sides of the bore hole forming an annulus that is filled with a conductive backfill composition. Alternatively, the probe is placed directly in the trench or on a layer of conductive backfill composition already in the trench. The conductive backfill composition is then poured on top of the probe.

In either case, the conductive backfill composition is oriented to create intimate contact with the probe and the earth. The conductive backfill composition creates a highly conductive region between the probe and the earth, thereby substantially increasing the allowable distance between the transmitter and the electromagnetic pickup device.

BRIEF DESCRIPTION OF THE DRAWINGS

For a more complete understanding of the present invention, including its features and advantages, reference is now made to the detailed description of the invention, taken in conjunction with the accompanying drawings of which:

FIG. 2 top view of a drilling rig including a pair of electromagnetic signal pickup devices of the present invention;

FIG. 3 is a cross-sectional view of a prior art electromagnetic pickup device;

FIG. 4 is a cross-sectional view of an electromagnetic signal pickup device of the present invention; and FIG. 5 is a cross-sectional view of an electromagnetic signal pickup device of the present invention.

DETAILED DESCRIPTION OF THE INVENTION

Figure 1:
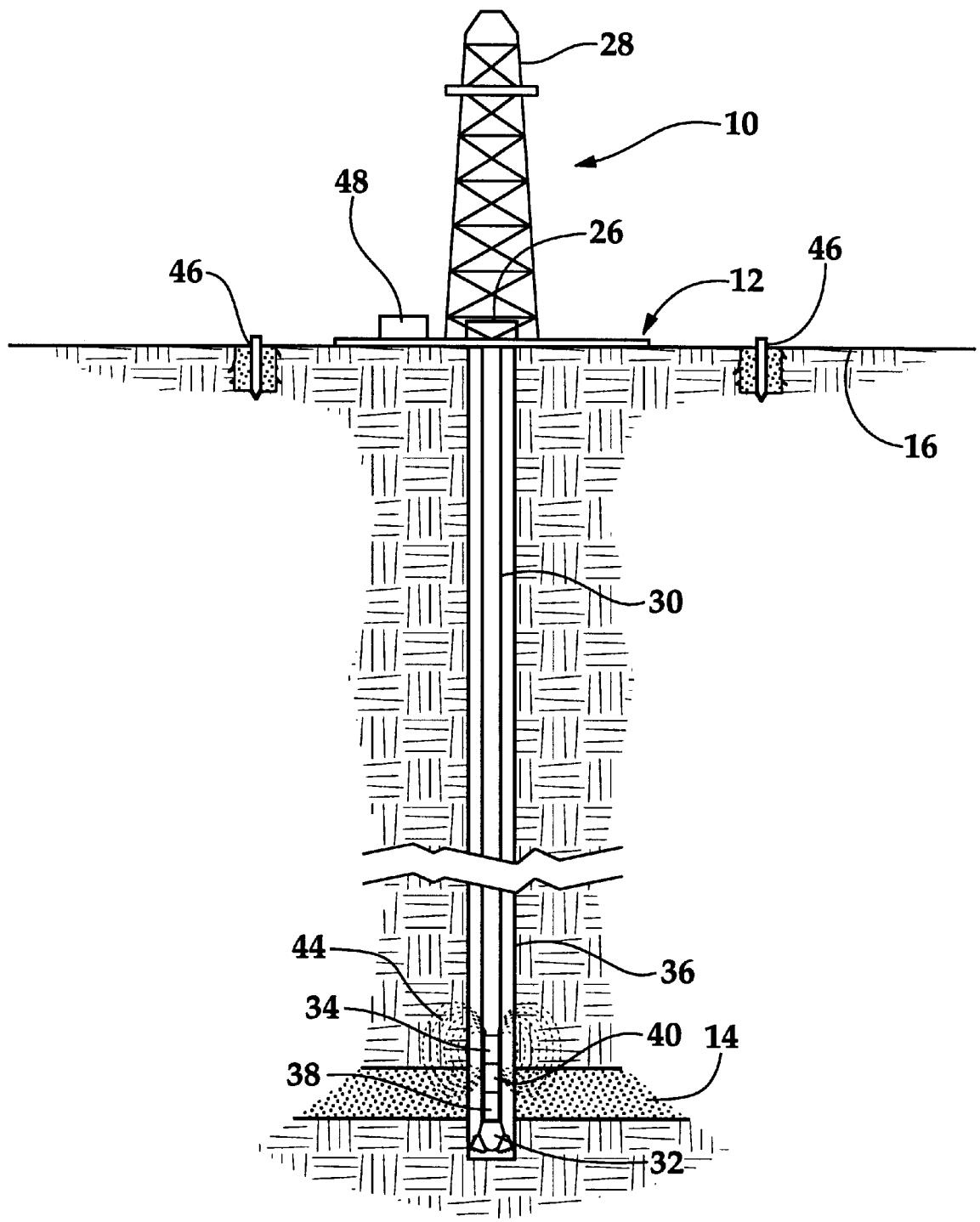
FIG. 1 is a schematic illustration of a drilling rig including a pair of electromagnetic signal pickup devices of the present invention.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Referring to FIG. 1, a plurality of electromagnetic signal pickup devices in use during an onshore drilling operation are schematically illustrated and generally designated 10. A drilling rig 12 is positioned over an oil and gas formation 14 located deep below the earth's surface 16. Drilling rig 12 has a derrick 26 and a hoisting apparatus 28 for raising and lowering drill string 30, including drill bit 32 and electromagnetic transmitter 34.

In a typical drilling operation, drill bit 32 is rotated by drill string 30, such that drill bit 32 penetrates through the various earth strata, forming wellbore 36. Measurement of parameters such as bit weight, torque, wear and bearing conditions may be obtained by sensors 38 located in the vicinity of drill bit 32. Additionally, parameters such as pressure and temperature as well as a variety of other environmental and formation information may be obtained by sensors 38. The signal generated by sensors 38 may typically be analog, which must be converted to digital data before electromagnetic transmission in the present system. The signal generated by sensors 38 is passed into an electronics package 40 including an analog to digital converter which converts the analog signal to a digital code utilizing "1" and "0" for information transmission.

Electronics package 40 may also include electronic devices such as an on/off control, a modulator, a microprocessor, memory and amplifiers. Electronics package 40 is powered by a battery pack including a plurality of batteries, such as nickel cadmium or lithium batteries, which are configured to provide proper operating voltage and current.

Once the electronics package 40 establishes the frequency, power and phase output of the information, electronics package 40 feeds the information to transmitter 34. Transmitter 34 may be a direct connect to drill string 30 or may electrically approximate a large transformer. The information is then carried uphole in the form of electromagnetic wave fronts 44 which travel through the earth. These electromagnetic wave fronts 44 are picked up by one or more electromagnetic pickup devices 46. Pickup devices 46 are disposed radially about drilling rig 12 and extend into the earth through surface 16 or are disposed beneath surface 16. Pickup devices 46 are electrically coupled to an electronics package 48. Electronics package 48 is electrically coupled to drill string 30. Thus, as electromagnetic wave fronts 44 reach pickup devices 46, a current is induced in pickup devices 46 that carries the information originally obtained by sensors 40.

The current is fed to an electronics package 48 that may include a variety of electronic devices such as a preamplifier, a demodulator, a plurality of filters, a timer, memory and a microprocessor. Electronics package 48 cleans up and amplifies the signal to reconstruct the original waveform, compensating for losses and distortion occurring during the transmission of electromagnetic wave fronts 44 through the earth. The information originally obtained by sensors 38 may then be further processed making any necessary calculations and error corrections such that the information may be displayed in a usable format.

Even though FIG. 1 depicts two pickup devices 46, it should be understood by one skilled in the art that the number of pickup devices 46 may be increased or decreased without departing from the principles of the present invention.

FIG. 2 shows a top view of drilling rig 12 and electromagnetic pickup devices 46. Drilling rig 12 includes derrick 26 that has drill string 30 positioned therein. Pickup devices 46 are electrically connected via wires 50 to electronics package 48 which is electrically connected to drill string 30 via wire 52 thereby forming a complete circuit. Pickup devices 46 and drill string 30 form electrodes for sensing the voltage therebetween. Pickup devices 46 may be spaced equidistant from drill string 30 in a radial direction or may be located at varying distances from drill string 30.

Even though FIGS. 1 and 2 have described electromagnetic pickup devices 46 with reference to a drilling operation, it should be noted by one skilled in the art that the principles of the present invention are also applicable throughout the lifetime of wellbore 34 including, but not limited to, during logging, testing, completing and producing the well.

In FIG. 3, a prior art electromagnetic pickup probe 54 is inserted into the earth through surface 16. As a result of the insertion process of probe 54, the periodic moisture content variation of the earth or other environmental factors, discontinuities 56 develop in the contact between probe 54 and the earth which create a high resistivity interface between probe 54 and the earth. In addition, the insertion of probe 54 and the variations in moisture content of the earth causes cracks 58 to develop and propagate which further increases the resistivity of the earth in the area adjacent to probe 54. The high resistivity in the region directly surrounding probe 54 causes a significant attenuation in the received strength of electromagnetic waves. In fact, the signal strength of electromagnetic waves may be reduced as much as 40% at the earth-probe interface. The significant attenuation of the strength of electromagnetic waves not only requires additional electronics to recreate the original signal, but also reduces the allowable distance between the electromagnetic transmitter and the probe 54.

In FIG. 4, a cross sectional view of electromagnetic pickup device 46 of the present invention is depicted. Electromagnetic pickup device 46 includes a probe 60 and a conductive backfill composition 62 disposed within the earth. Probe 60 may be a rod or tubing constructed from any electrically conductive material such as steel, copper or a copper clad. Probe 60 may alternatively be a magnetic pickup, a toroid or even a bare wire.

Conductive backfill composition 62 greatly reduces the resistivity of the region around probe 60 by filling the voids and cracks in the earth that would otherwise create discontinuities in the electrical contact between probe 60 and the earth. By creating a highly conductive region around probe 60, conductive backfill composition 62 greatly reduces the attenuation of the received electromagnetic wave fronts 44, thereby reducing the number of electronic devices required to process the information carried by electromagnetic wave fronts 44 and increasing the allowable distance between transmitter 34 and pickup devices 46.

Conductive backfill composition 62 may be formed from a carbonaceous material. For example, conductive backfill composition 62 may be formed of graphite material, a calcine fluid petroleum coke or the like. Calcine fluid petroleum coke is especially advantageous for use as conductive backfill composition 62 due to its characteristic hard, round, uncrushable shape along with its fluid flow characteristic which allows calcine fluid petroleum coke to flow into voids and cracks in the earth while maintaining intimate contact with probe 60. In addition, calcine fluid petroleum coke is available in a highly uniform structure capable of flowing through a Tyler standard 16 sieve.

In operation, bore hole 64 is drilled in the earth to have a length and diameter sufficient to receive probe 60. For example, the length of bore hole 64 may be between about 1 and 5 feet and is preferably about 3 feet. The diameter of bore hole 64 may be between about 3 and 6 inches and is preferably about 4 inches. Once bore hole 64 is drilled, probe 60 may be inserted therein such that probe 60 has a spaced apart relationship with the sides of bore hole 64 forming annulus 66. Conductive backfill composition 62 may then be poured into bore hole 64 filling annulus 66 such that annulus 66 becomes a highly conductive region. Once conductive backfill composition 62 is in place, pickup device 46 may receive information carried on electromagentic wave fronts 44 which were radiated into the earth by transmitter 34 from a great distance. Additionally, it should be noted by one skilled in the art that pickup device 46 of the present invention may alternatively be used as a downlink to transmit electromagnetic waves carrying information from the surface downhole to, for example, operate downhole equipment or prompt sensors 40 to obtain information which will be transmitted uphole by transmitter 34 to pickup devices 46.

After a drilling or other operation using electromagnetic pickup device 64 has been completed, conductive backfill composition 62 may be removed from bore hole 64 using a conventional vacuum system. After conductive backfill composition 62 is removed, probe 60 may also be removed and bore hole 64 may be filled with the earth originally removed to create bore hole 64 leaving it in the original state.

In FIG. 5, a cross sectional view of electromagnetic pickup device 68 of the present invention is depicted. Electromagnetic pickup device 68 includes a probe 60 and conductive backfill composition 62 disposed within a trench 70 in the earth. Conductive backfill composition 62 greatly reduces the resistivity of the region around probe 60 by filling the voids and cracks in the earth that would otherwise create discontinuities in the electrical contact between probe 60 and the earth. By creating a highly electrically conductive region 72 around probe 60, conductive backfill composition 62 greatly reduces the attenuation of the received electromagnetic wave fronts 44, thereby reducing the number of electronic devices required to process the information carried by electromagnetic wave fronts 44 and increasing the allowable distance between transmitter 34 and pickup device 68.

In operation, probe 60 is placed directly in trench 70 or on a layer of conductive backfill composition 62 that has already been poured into trench 70. Trench 70 has a length and depth sufficient to receive probe 60, for example, the length of trench 70 may be between about 1 and 5 feet and is preferably about 3 feet while the depth of trench 70 may be between about 3 and 12 inches and is preferably about 6 inches. Once probe 60 is placed in trench 70, conductive backfill composition 62 may be poured on top of probe 60 in trench 70 such that trench 70 becomes a highly electrically conductive region 72. Once conductive backfill composition 62 is in place, pickup device 68 may receive information carried on electromagnetic wave fronts 44 which were radiated into the earth by transmitter 34 at a great distance or may transmit electromagnetic waves into the earth.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An electromagnetic pickup apparatus comprising:
   a probe adapted to receive electromagnetic signals, at least a portion of the probe disposed beneath the surface of the earth; and
   a conductive backfill composition substantially surrounding the probe and in intimate contact with the probe and the earth, thereby establishing a highly conductive region between the probe and the earth; wherein
   the conductive backfill composition comprises a carbonaceous material.

2. The electromagnetic pickup apparatus as recited in claim 1 wherein the highly electrically conductive region substantially reduces the attenuation of a received electromagnetic.

3. The electromagnetic pickup apparatus as recited in claim 1 wherein the probe is positioned at a location in the earth having a bore hole of a length and diameter to receive the probe such that the probe is in a spaced apart relationship with the sides of the bore hole.

4. The electromagnetic pickup apparatus as recited in claim 1 wherein the probe is positioned at a location in the earth having a trench of a length and depth sufficient to receive the probe and the conductive backfill composition.

5. The electromagnetic pickup apparatus as recited in claim 1 wherein the conductive backfill composition further comprises graphite.

6. The electromagnetic pickup apparatus as recited in claim 1 wherein the conductive backfill composition further comprises calcine fluid petroleum coke.

7. The electromagnetic pickup apparatus as recited in claim 1 wherein the conductive backfill composition is of a size to pass a Tyler standard number 16 sieve.

8. A method for reducing the attenuation of a received electromagnetic signal by an electromagnetic pickup device comprising the steps of:

providing a probe adapted to receive electromagnetic signals;

disposing at least a portion of the probe beneath the surface of the earth; and surrounding the probe with a conductive backfill composition such that the conductive backfill is in intimate contact with the probe and the earth; wherein the conductive backfill composition comprises a carbonaceous material.

9. The method as recited in claim 8 further comprising the step of drilling a bore hole in the earth having a length and diameter sufficient to receive the probe.

10. The method as recited in claim 8 further comprising the step of digging a trench in the earth having a length and depth sufficient to receive the probe.

11. The method as recited in claim 8 wherein the conductive backfill composition further comprises graphite.

12. The method as recited in claim 8 wherein the conductive backfill composition further comprises calcine fluid petroleum coke.

13. The method as recited in claim 8 wherein the conductive backfill composition is of a size to pass a Tyler standard number 16 sieve.

14. An apparatus for receiving an electromagnetic signal comprising:

a probe adapted to receive electromagnetic signals, the probe at least partially disposed within a bore hole in the earth, the bore hole having a length and diameter to receive the probe such that an annulus is formed between the probe and the bore hole; and a conductive backfill composition substantially filling the annulus between the bore hole and the probe and in intimate contact with the probe and the earth, thereby forming a highly electrically conductive annular region between the probe and the earth; wherein the conductive backfill composition comprises a carbonaceous material.

15. The apparatus as recited in claim 14 wherein the highly electrically conductive annular region substantially reduces the attenuation of a received electromagnetic signal.

16. The apparatus as recited in claim 14 wherein the conductive backfill composition further comprises graphite.

17. The apparatus as recited in claim 14 wherein the conductive backfill composition further comprises calcine fluid petroleum coke.

18. The apparatus as recited in claim 14 wherein the conductive backfill composition is of a size to pass a Tyler standard number 16 sieve.

* * * * *